United States Patent
Tokizawa

(10) Patent No.: US 7,986,072 B2
(45) Date of Patent: Jul. 26, 2011

(54) STATOR CORE OF ELECTRIC ROTATING MACHINE AND METHOD OF MANUFACTURING THE CORE

(75) Inventor: Takashi Tokizawa, Nisshin (JP)

(73) Assignee: Denso Corporation, Kariya (JP)

( * ) Notice: Subject to any disclaimer, the term of this patent is extended or adjusted under 35 U.S.C. 154(b) by 270 days.

(21) Appl. No.: 12/285,067

(22) Filed: Sep. 29, 2008

(65) Prior Publication Data

US 2009/0083964 A1    Apr. 2, 2009

(30) Foreign Application Priority Data

Sep. 28, 2007   (JP) .................................. 2007-253518

(51) Int. Cl.
*H02K 15/02* (2006.01)
(52) U.S. Cl. .......... 310/216.018; 310/216.055; 29/592.1
(58) Field of Classification Search ........... 310/216.018, 310/216.041–216.044, 216.047–216.049, 310/216.051, 216.052, 216.054–216.056, 310/49.23, 49.25, 49.26, 254, 254.1
See application file for complete search history.

(56) References Cited

U.S. PATENT DOCUMENTS

| | | | | |
|---|---|---|---|---|
| 4,395,815 A | * | 8/1983 | Stanley et al. ................... | 29/598 |
| 6,308,549 B1 | * | 10/2001 | Tokizawa et al. ............... | 72/136 |
| 7,026,735 B2 | | 4/2006 | Akita et al. | |
| 2005/0061046 A1 | * | 3/2005 | Koshizaka et al. ............. | 72/136 |
| 2005/0073211 A1 | * | 4/2005 | Lee ................................. | 310/216 |
| 2006/0123621 A1 | | 6/2006 | Akita et al. | |
| 2007/0013255 A1 | * | 1/2007 | Wakitani et al. ............... | 310/216 |
| 2008/0072415 A1 | | 3/2008 | Koshizaka et al. | |

FOREIGN PATENT DOCUMENTS

| | | |
|---|---|---|
| JP | A-2-299443 | 12/1990 |
| JP | A-05-023754 | 2/1993 |
| JP | U-6-44353 | 6/1994 |
| JP | A-2001-112197 | 4/2001 |
| JP | B2-3539626 | 7/2004 |
| JP | A-2005-94951 | 4/2005 |
| JP | A-2005-124319 | 5/2005 |
| JP | A-2006-246586 | 9/2006 |

OTHER PUBLICATIONS

Sep. 29, 2009 Office Action issued in Japanese Patent Application No. 2007-253518 (with translation).

* cited by examiner

*Primary Examiner* — Quyen Leung
*Assistant Examiner* — Naishadh N Desai
(74) *Attorney, Agent, or Firm* — Oliff & Berridge, PLC

(57) ABSTRACT

A stator core of an electric rotating machine has steel sheets formed of a steel plate wound in the cylindrical shape. Each sheet has teeth disposed along the circumferential direction of the core on the inner side of the sheet, divided end portions disposed along the circumferential direction on the outer side of the sheet, slits alternately disposed with the divided end portions along the circumferential direction, and a boundary portion disposed between the group of teeth and the group of divided end portions. The teeth and the divided end portions substantially have the same constant thickness. The boundary portion has a changing thickness decreased toward the outer side.

15 Claims, 10 Drawing Sheets

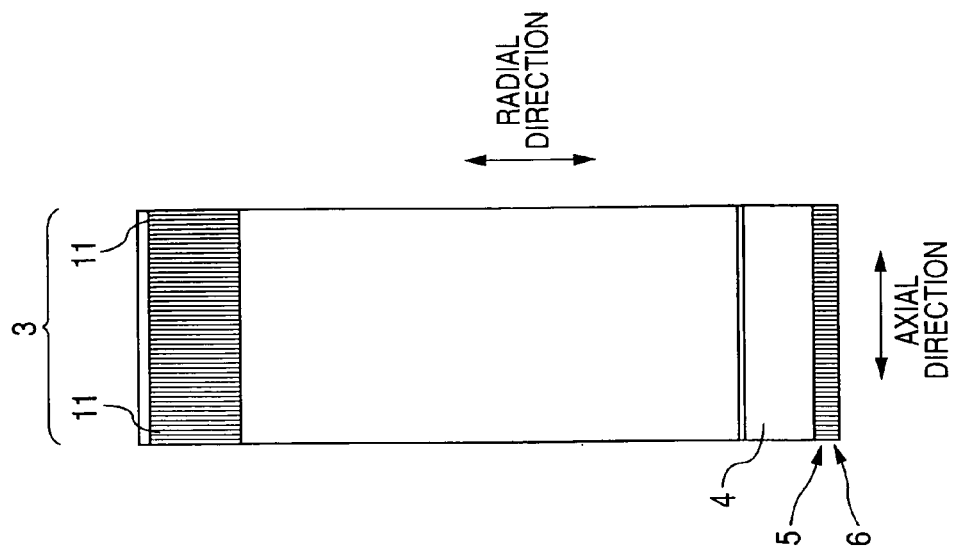
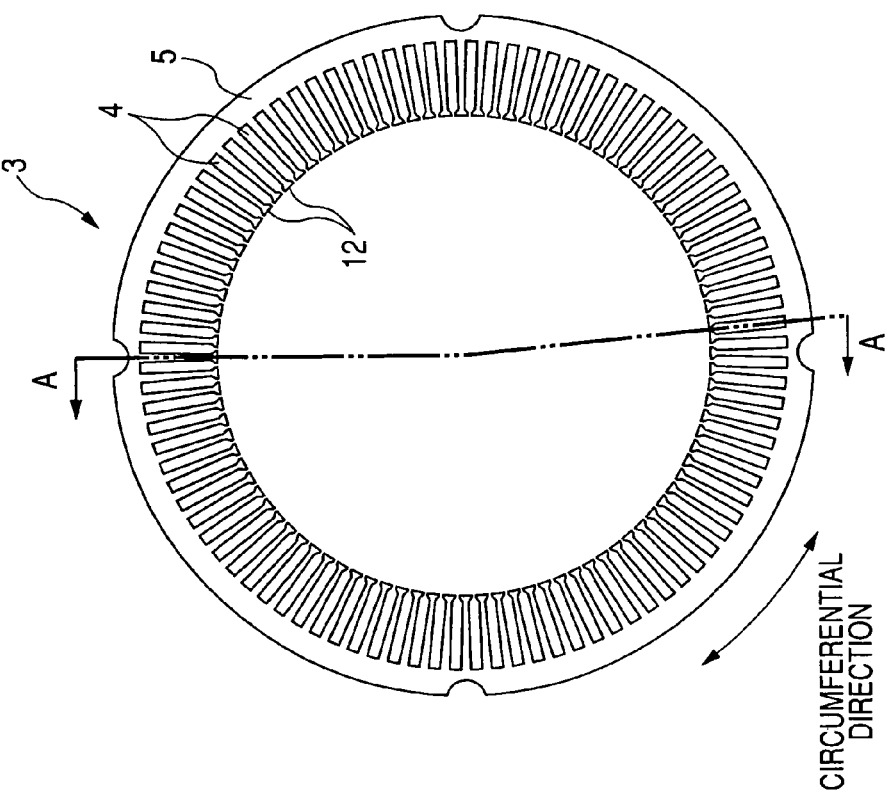

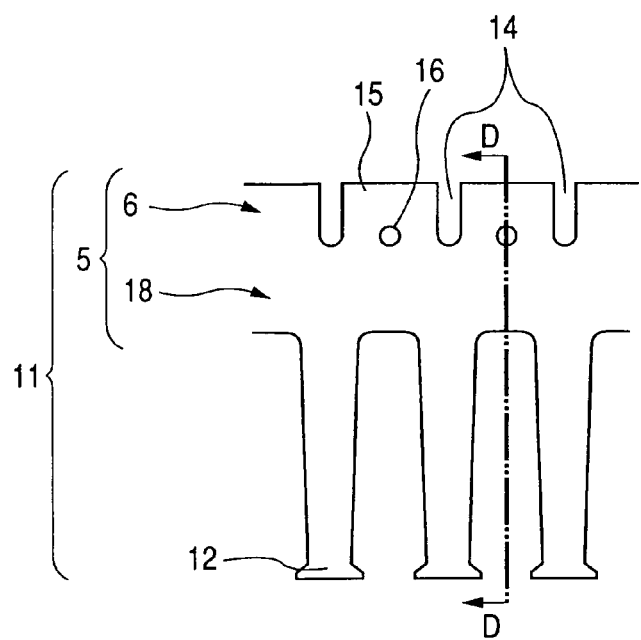 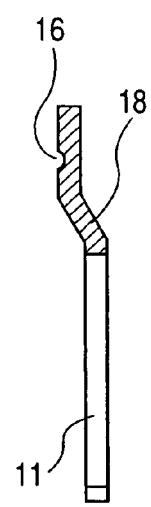
FIG. 10A   FIG. 10B
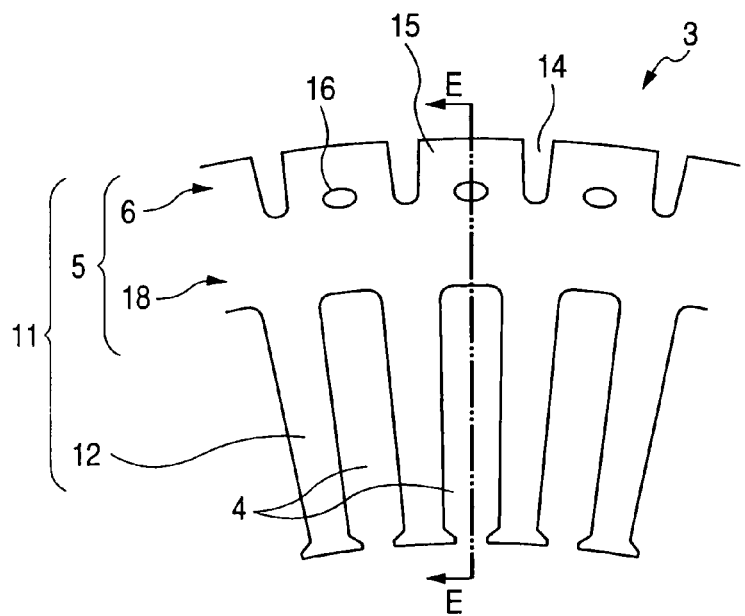 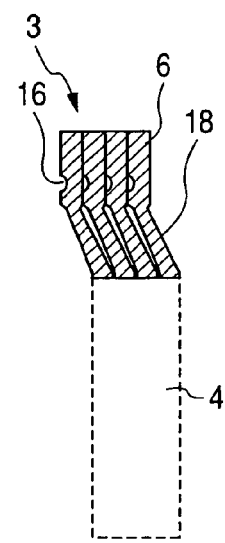
FIG. 11A   FIG. 11B

STATOR CORE OF ELECTRIC ROTATING MACHINE AND METHOD OF MANUFACTURING THE CORE

CROSS-REFERENCE TO RELATED APPLICATION

This application is based upon and claims the benefit of priority of the prior Japanese Patent Application 2007-253518 filed on Sep. 28, 2007, so that the contents of which are incorporated herein by reference.

BACKGROUND OF THE INVENTION

1. Field of the Invention

The present invention relates to a stator core of an electric rotating machine which has a plurality of ring-shaped steel sheets obtained from a single steel plate wound in the cylindrical shape. The present invention also relates to a method of manufacturing the core wherein each steel sheet is lengthened in the circumferential direction when the steel plate is wound into the steel sheets.

2. Description of Related Art

As an electric rotating machine generating a rotational force or electric power, a helical stator core has been generally used. To form this stator core, magnetic pole teeth are press-formed on one side of a long steel plate, and the steel plate is helically wound or bent to obtain a lamination of a plurality of ring-shaped steel sheets formed in a cylindrical shape. Each ring-shaped steel sheet has the magnetic teeth and slots alternately arranged along the circumferential direction of the sheet on the inner side of the sheet. Further, the long steel plate is wound while the other side portion of the plate is thinned in a taper shape in section by a roller or the like so as to lengthen the outer side portion of each steel sheet. Therefore, the plate can be easily wound. The thinning and winding of the plate is, for example, disclosed in Japanese Patent Specification No. 3539626. As a result, a laminated core having the ring-shaped steel sheets is obtained. The outer end portion of each ring-shaped steel sheet is thinned.

Further, after the laminated core is obtained, positions of the sheets of the laminated core are minutely adjusted in each of the radial and circumferential directions of the laminated core so as to align the sheets within a permissible range in the radial and circumferential directions. Then, the outer end portions of the sheets are partially welded to one another to fix the positional relationship of the sheets aligned in the radial and circumferential directions. Then, in a finishing process, ironing (or trimming or shaving) is performed for the laminated core. This ironing is, for example, disclosed in Published Japanese Patent First Publication No. 2006-246586. The ironing is performed to adjust the circularity of the laminated core in outer diameter, the concentricity between inner and outer portions of the laminated core, and the perpendicularity of each sheet to the inner and outer circumferential surfaces of the laminated core. Therefore, a stator core is formed from the laminated core by performing the ironing for the laminated core.

At the final step of the finishing process, the ironing is performed for the outer end portions of the sheets to set back ends of the outer end portions excessively lengthened toward the radial direction of the cylindrical core for the purpose of adjusting the outer diameter of the core. In this ironing, an ironing member of a forming apparatus is moved up and down along the axial direction of the laminated core to push the outer end portions of the sheets toward the inner side of the axial direction. Therefore, plastic deformation is caused in the outer end portions of the sheets in response to the ironing load. Ends of the outer end portions are set back in response to the plastic deformation.

However, because the outer end portions of the sheets are thinned, the outer end portions of the sheets are spaced apart from one another through openings along the axial direction. In this case, bending deformation is easily caused in the outer end portions of the sheets in the axial direction in response to the ironing load, so that the openings among the outer end portions are enlarged without setting back any bended outer end portion.

To prevent the bending deformation caused in the outer end portions, a first prior art and a second prior art are known. In these prior arts, before the ironing for the outer end portions of the sheets, the outer end portions are pushed to one another along the axial direction so as to be brought into contact with one another.

FIG. 1A is a longitudinal sectional view of an inward inclination type stator core in a first prior art, while FIG. 1B is an enlarged sectional view of outer end portions of sheets of the stator core shown in FIG. 1A. FIG. 2A is a longitudinal sectional view of an outward inclination type stator core in a second prior art, while FIG. 2B is an enlarged sectional view of outer end portions of sheets of the stator core shown in FIG. 2A.

As shown in FIG. 1A, in the first prior art, a laminated core 101 has a plurality of steel sheets 111, and each sheet 111 has an outer end portion 103 of a core back portion 102. The outer end portions 103 of the sheets 111 are thinned in the winding process. The outer end portions 103 placed on each of both outer sides (left and right sides in FIG. 1A) in the axial direction are inclined toward the outer end portions 103 placed in the center side in the axial direction. The outer end portions 103 placed in the center side of the laminated core 101 extend straight along the radial direction. Then, the ironing is performed for the outer end portions 103. Therefore, the inward inclination type stator core 101 is formed so as to have the inwardly-inclined outer end portions 103 being in contact with one another.

Further, as shown in FIG. 2A, in the second prior art, a long steel plate having a portion 118 inclined or bent toward one side of the plate is helically wound into a laminated core 101 having a plurality of steel sheets 111 while the inclined portion 118 is thinned. Therefore, each steel sheet 111 has an outer end portion 103 in a core back portion 102. The outer end portion 103 derived from the portion 118 has been thinned and inclined. Then, the ironing is performed for the outer end portions 103. Therefore, an outward inclination type stator core 101 is formed so as to have the inclined outer end portions 103 being in contact with one another.

Then, in the prior arts, a stator coil (not shown) is inserted into slots 104 of the core 101 to form a cylindrical stator, and a rotor acting as an armature is disposed in a center space of the stator so as to face the stator. Then, as shown in FIG. 1B and FIG. 2B, to fix the core 101 to a frame 109 of an electric rotating machine, the core 101 is inserted into an opening 110 such that two outer end portions 103 placed at axial ends of the core 101 come in contact with respective walls of the frame 109. The walls of the frame 109 are formed in parallel to each other and face each other through the opening 110. The core 101 is placed such that the axial direction of the core 101 is parallel to a line connecting the walls of the frame 109. Then, the core 101 is fastened to the frame 109 by through bolts or the like. Therefore, an electric rotating machine with the stator and rotor is manufactured. The stator acts as a field of the machine.

However, it is difficult to reliably fix the stator core 101 to the frame 109. As shown in FIG. 1B and FIG. 2B, the stator core 101 is forcedly inserted into the opening 110 of the frame 109 and is fastened to the frame 109. In case of the inward inclination type stator core 101, as shown in FIG. 1B, because the two outer end portions 103 placed at the axial ends of the core 101 are inclined toward the center side with respect to the radial direction, the two outer end portions 103 of the core 101 are not parallel to the walls of the frame 109. Therefore, when the core 101 is fastened to the frame 109, the two outer end portions 103 of the core 101 are not in face-to-face contact (hereinafter, called face contact) with the walls of the frame 109 but are in line-to-line contact (hereinafter, called line contact) with the walls of the frame 109. Therefore, the force for fixing the core 101 to the frame 109 becomes insufficient. Because of the insufficient fixing force, the through bolts fastening the core 101 to the frame 109 are easily loosened by external vibrations caused in the machine, and the center axis of the core 101 is shifted from the center axis of the rotor. In this case, the air gap between the inner circumferential surface of the stator and the outer circumferential surface of the rotor lacks uniformity along the circumferential direction of the core 101, and the rotational force or electric power outputted from the machine is undesirably reduced. Further, the magnetic attraction force acting between the stator and the rotor lacks uniformity along the circumferential direction, so that noise caused by the lack of uniformity in the magnetic attraction force is undesirably increased.

Further, in case of the outward inclination type stator core 101, as shown in FIG. 2B, because two outer end portions 103 placed at the axial ends of the core 101 are inclined toward one side of the axial direction, the two outer end portions 103 of the core 101 are not parallel to the walls of the frame 109. Therefore, the two outer end portions 103 of the core 101 are not in face-contact with the walls of the frame 109 but are inline-contact with the walls of the frame 109. Further, the line-contact point of one outer end portion 103 of the core 101 is placed at the top of the inclined outer end portion 103 furthest from the center axis of the core 101, while the line-contact point of the other outer end portion 103 of the core 101 is nearer to the center axis. That is, the line-contact point of one outer end portion 103 of the core 101 differs in the radial direction from the line-contact point of the other outer end portion 103 of the core 101.

In response to the difference of the line-contact points in the radial direction, not only the force for fixing the core 101 to the frame 109 becomes insufficient, but also a rotational moment M is generated in the core 101. As the fastening force of the through bolts is increased, this rotational moment M is increased. The moment M causes each inclined outer end portion 103 to extend straight along the radial direction. Further, the moment M causes magnetic pole teeth 112 integrally connected with the portions 103 in the core 101 to be raised toward one side of the axial direction and to be inclined. In this case, the stator coil inserted into the slots 104 of the core 101 is deformed or damaged, so that the insulation performance of the stator coil covered with an insulation film is undesirably lowered. Further, the air gap between the stator and the rotor is enlarged in the radial direction, so that the output of the machine is sometimes reduced.

To solve these problems caused by the line-contacts of the core 101 with the frame 109, Published Japanese Patent First Publication No. H5-23754 (1993) discloses a stator wherein portions of both end surfaces of a core with inclined outer end portions are cut to form the end surfaces extending in perpendicular to the axial direction of the core. However, it is troublesome to cut the end surfaces. For example, a cutting machine and a cutting tool are required, and it takes a long time to cut the end surfaces. Therefore, the manufacturing cost of the machine is undesirably increased.

SUMMARY OF THE INVENTION

An object of the present invention is to provide, with due consideration to the drawbacks of the conventional, a stator core of an electric rotating machine wherein a plurality of ring-shaped steel sheets obtained from a steel plate wound in a cylindrical shape are disposed so as to be reliably fixed in the machine while maintaining a sufficient fixing force against vibrations of the machine.

The object of the present invention is also to provide a method of manufacturing a stator core wherein a plurality of ring-shaped steel sheets are formed by winding a steel plate in a cylindrical shape while a back portion of each steel sheet is lengthened in the circumferential direction so as to be reliably fixed in the machine while maintaining a sufficient fixing force against vibrations of the machine.

According to an aspect of this invention, the object is achieved by the provision of a stator core of an electric rotating machine comprising a plurality of ring-shaped steel sheets obtained from a single steel plate wound in a cylindrical shape, wherein each steel sheet comprises a plurality of teeth disposed along a circumferential direction of the core on the inner side of the steel sheet in the radial direction of the core, a plurality of divided end portions disposed along the circumferential direction on the outer side of the steel sheet in the radial direction, a plurality of slits alternately disposed with the divided end portions along the circumferential direction on the outer side, and a boundary portion disposed between the group of teeth and the group of divided end portions. The thickness of the divided end portions directed in the axial direction of the core is substantially equal to the thickness of the teeth and is substantially constant in the radial direction. The boundary portion has a changing thickness decreased toward the outer side.

With this structure of the stator core, an outer end portion composed of the divided end portions of each steel sheet has the constant thickness equal to that of one tooth. Therefore, when the outer end portions of the steel sheets are placed along the axial direction of the core to be brought into contact with one another, the outer end portions of the steel sheets become parallel to one another and become perpendicular to the axial direction. That is, no outer end portion is inclined toward the axial direction but extends straight toward the radial direction of the core.

The machine disposing the core has a frame with two side walls being in parallel to each other and facing each other through an opening of the frame. When the core is disposed in the machine such that two outer end portions placed at the axial ends of the core are attached to the walls of the frame and such that the axial direction of the core is parallel to a line connecting the walls, each of the outer end portions comes in face-contact with the frame wall. Therefore, the core can be tightly fastened to the frame.

Accordingly, the core can be reliably fixed in the machine while maintaining a sufficient fixing force against vibrations of the machine, and the machine with the core can reliably output a rated electric power or a rated rotational force for a long time.

According to the aspect of this invention, the object is also achieved by the provision of a method of manufacturing a stator core of an electric rotating machine, comprising the steps of (1) forming a single steel plate with a plurality of teeth and a back portion substantially set at a constant thickness such that the teeth are placed along the longitudinal direction of the steel plate on the first side of the steel plate and such that the back portion is disposed on the second side of the steel plate opposite to the first side, (2) winding the steel plate to form a plurality of ring-shaped steel sheets in a cylindrical shape such that the teeth of the steel plate are placed on the inner side of the steel sheets and such that the back portion of the steel plate is placed on the outer side of the steel sheets, and (3) performing ironing for the back portions of the steel sheets to manufacture a stator core. Especially, the step of forming the steel plate includes forming a plurality of slits placed along the longitudinal direction in the back portion to form a plurality of divided end portions alternately placed with the slits and to form a boundary portion disposed between the group of teeth and the group of divided end portions. The step of winding the steel plate includes thinning the boundary portion of the steel plate such that the thickness of the boundary portion in each steel sheet is decreased toward the outer side.

With this manufacturing method, when the steel plate is wound or bent in a cylindrical shape, each slit is deformed so as to lengthen the width of the slit in the circumferential direction of the core. Further, while the steel plate is wound, the boundary portion of the steel plate is thinned so as to decrease the thickness of the boundary portion of each steel sheet toward the outer side. That is, the steel plate is wound into the steel sheets in the cylindrical shape so as to lengthen each steel sheet in the circumferential direction. Accordingly, although an outer end portion composed of the divided end portions of each steel sheet is not thinned, the steel plate can be easily wound into the steel sheets.

Further, because no outer end portion is thinned, the outer end portion of each steel sheet has the same constant thickness as that of the teeth of the steel sheet. In this case, the outer end portions of the steel sheets are aligned in parallel to one another so as to be perpendicular to the axial direction. That is, no outer end portion is inclined toward the axial direction but extends straight toward the radial direction of the core. Therefore, when the ironing is performed for the outer end portions, elastic deformation is easily caused in the outer end portions in response to the ironing load without forming any opening between the outer end portions. Accordingly, the outer diameter of the core can be easily adjusted in the ironing process.

Moreover, when the core is disposed in the machine such that two outer end portions placed at the axial ends of the core are attached to respective side walls of a frame being in parallel to each other and facing each other through an opening of the frame and such that the axial direction of the core is parallel to a line connecting the walls, each of the two outer end portions reliably comes in face-contact with the frame wall. Therefore, the core can be tightly fastened to the frame.

Accordingly, the stator core can be manufactured according to this method such that the core is reliably fixed in the machine while maintaining a sufficient fixing force against vibrations of the machine. That is, the machine with this core can reliably output a rated electric power or a rated rotational force for a long time.

Further, in this method, the process for forming the steel plate with the teeth, the process for winding the steel plate into the steel sheets and the process for performing the ironing for the steel sheets are performed in the same manner as in the prior art to manufacture a stator core. Accordingly, the stator core can be easily and rapidly manufactured from the steel plate without adding any process performed by using a new processing device.

BRIEF DESCRIPTION OF THE DRAWINGS

FIG. 4A is a plan view of the stator core shown in FIG. 3;

FIG. 4B is a sectional view taken substantially along line A-A of FIG. 4A;

FIG. 10A is a plan view of a portion of a steel plate according to the second embodiment of the present invention;

FIG. 10B is a sectional view taken substantially along line D-D of FIG. 10A;

FIG. 11A is a plan view of a portion of a laminated core obtained by winding the plate shown in FIG. 10A;

FIG. 11B is a sectional view taken substantially along line E-E of FIG. 11A.

DETAILED DESCRIPTION OF THE PREFERRED EMBODIMENTS

Figure 1A:
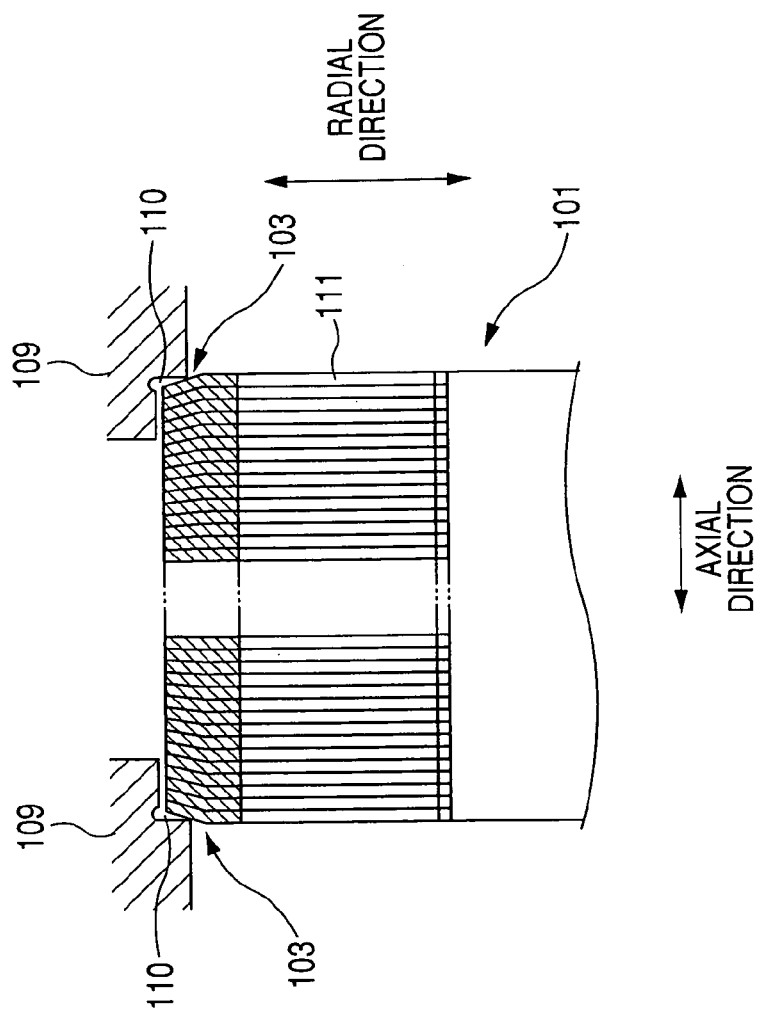
FIG. 1A is a longitudinal sectional view of an inward inclination type stator core in a first prior art.
Figure 1B:
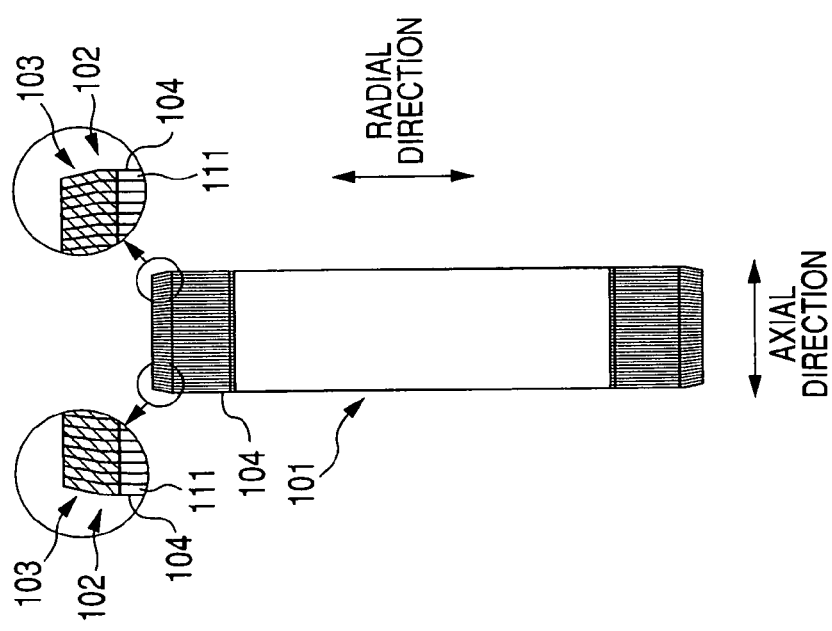
FIG. 1B is an enlarged sectional view of outer end portions of sheets of the stator core, shown in FIG. 1A, fixed to a frame of an alternator.
Figure 2B:
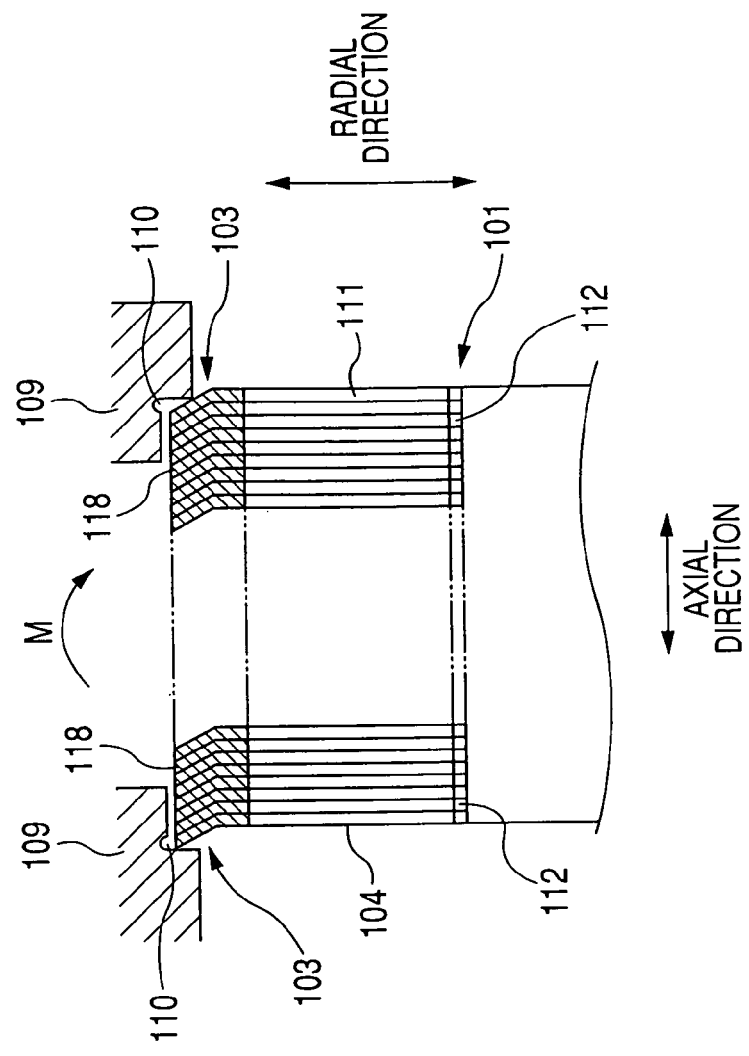
FIG. 2B is an enlarged sectional view of outer end portions of sheets of the stator core, shown in FIG. 2A, fixed to a frame of an alternator.
Figure 2A:
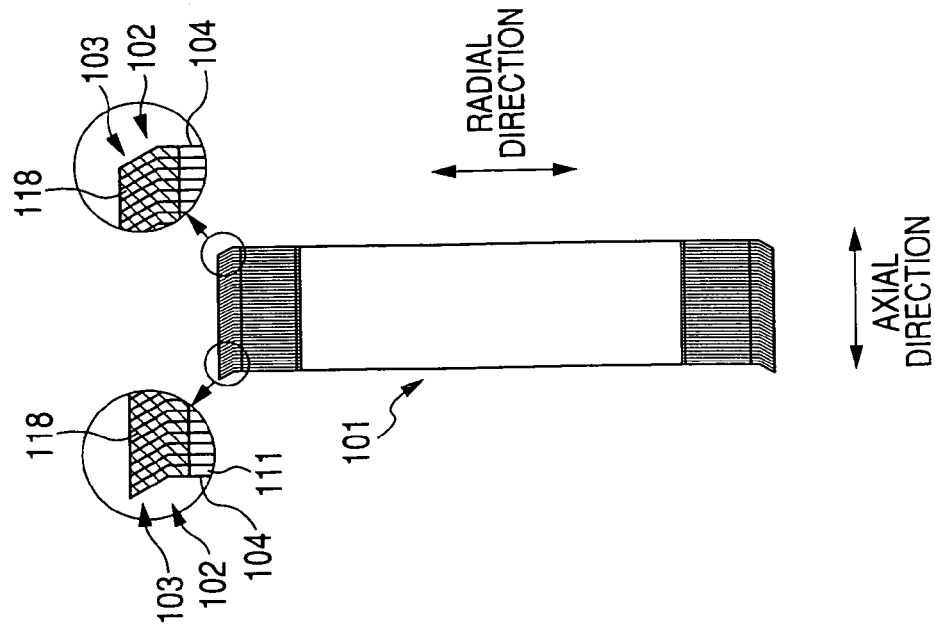
FIG. 2A is a longitudinal sectional view of an outward inclination type stator core in a second prior art.

Embodiments of the present invention will now be described with reference to the accompanying drawings, in which like reference numerals indicate like parts, members or elements throughout the specification unless otherwise indicated.

Embodiment 1

Figure 3:
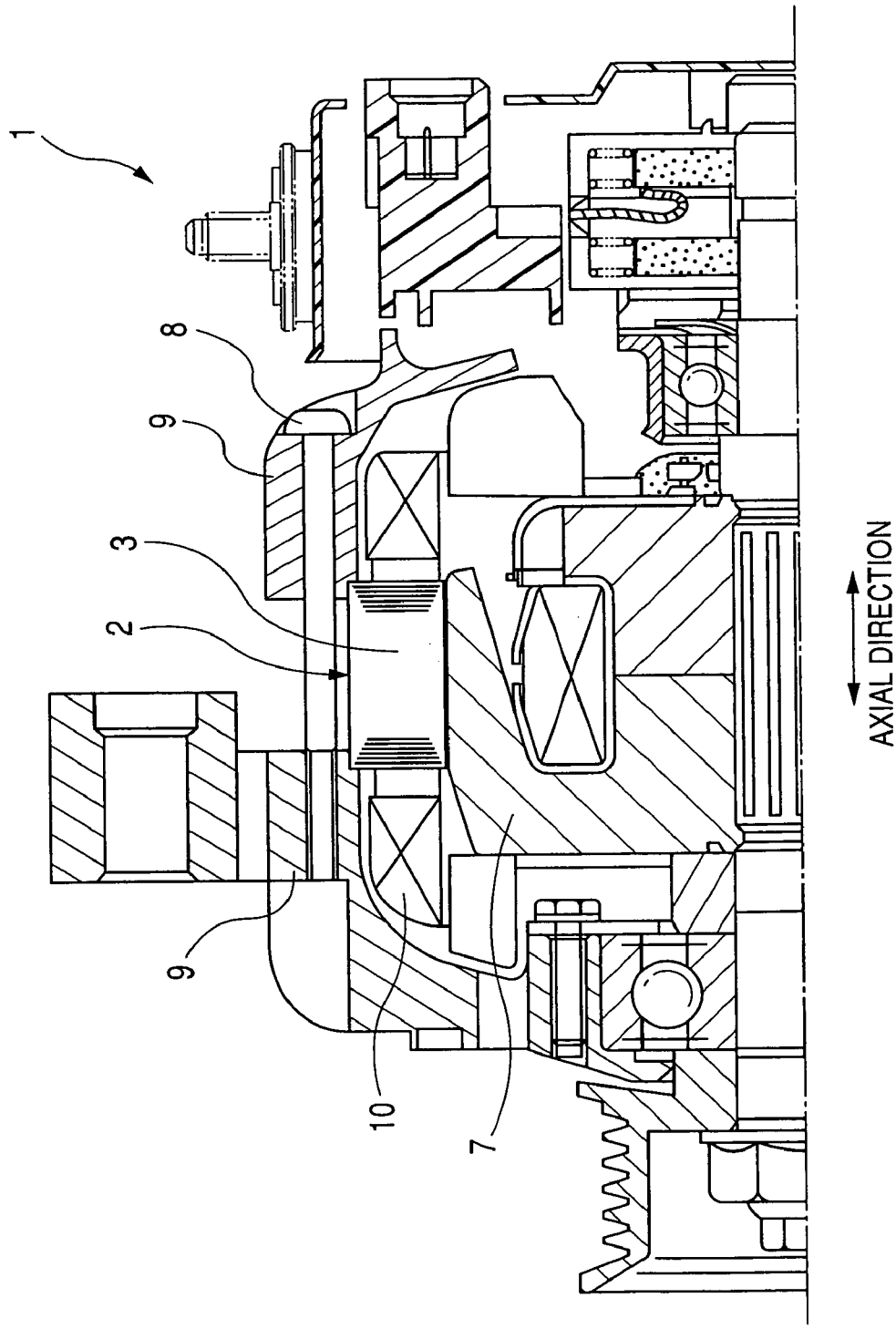
FIG. 3 is a side view, partially in cross-section, of an upper half portion of an alternator with a stator core according to embodiments of the present invention.

FIG. 3 is a side view, partially in cross-section, of an upper half portion of an alternator with a stator core according to first and second embodiments.

As shown in FIG. 3, an alternator 1 representing an electric rotating machine is, for example, mounted in a vehicle. The alternator 1 has a cylindrical stator 2, a columnar rotor 7 disposed in a center hole of the stator 2, a frame 9 covering the stator 2 and the rotor 7, and a plurality of through bolts 8 fastening the stator 2 to the frame 9. The stator 2 has a cylindrical stator core 3 and a plurality of stator coils 10 wound on the core 3. The rotor 7 acts as an armature. The stator 2 acts as a field.

The stator core 3 is placed in an opening between side walls of the frame 9 and is fastened to the frame 9 by the through bolts 8 penetrating through the frame 9. Each side wall of the frame 9 extends to be perpendicular to the axial direction (or center axis) of the core 3.

With this structure of the alternator 1, as is well known, when the rotor 7 is rotated on its own axis in response to an external rotational force, a magnetic field rotated with the rotor 7 is induced in the rotor 7. In response to this magnetic field, the core 3 is magnetized, and an alternating current is generated in the coils 10. This alternating current is rectified to a direct current, and electric power of the direct current is outputted from the alternator 1.

FIG. 4A is a plan view of the stator core 3 shown in FIG. 3, while FIG. 4B is a sectional view taken substantially along line A-A of FIG. 4A.

As shown in FIG. 4A and FIG. 4B, the stator core 3 has a plurality of ring-shaped steel sheets 11 disposed in layers. These sheets 11 are obtained by press-forming magnetic pole teeth 12 on one side of a long steel plate and helically winding the plate into the core 3 in the cylindrical shape. Each sheet 11 has a ring-shaped core back portion 5 disposed on the outer side of the sheet 11 and the teeth 12 disposed on the inner side of the sheet 11. The teeth 12 and slots 4 are alternately disposed along the circumferential direction of the sheet 11, and the teeth 12 are arranged at equal intervals. The stator coils 10 (see FIG. 3) are received in the slots 4 so as to be wound on the core 3.

The back portion 5 of each sheet 11 has a sheet outer end portion 6 placed on the outermost side of the sheet 11. The portions 6 of the sheets 11 are formed in a predetermined shape. The portions 5 of the sheets 11 form a core back portion of the core 3. The portions 6 of the sheets 11 form a core outer end portion of the core 3. The inner ends of the teeth 12 of the sheets 11 form a core inner portion of the core 3. For convenience of explanation, the teeth 12 of the sheets 11 also form a plurality of teeth 12 of the core 3, and the slots 4 of the sheets 11 also form a plurality of slots 4 of the stator core 3.

Figure 5:
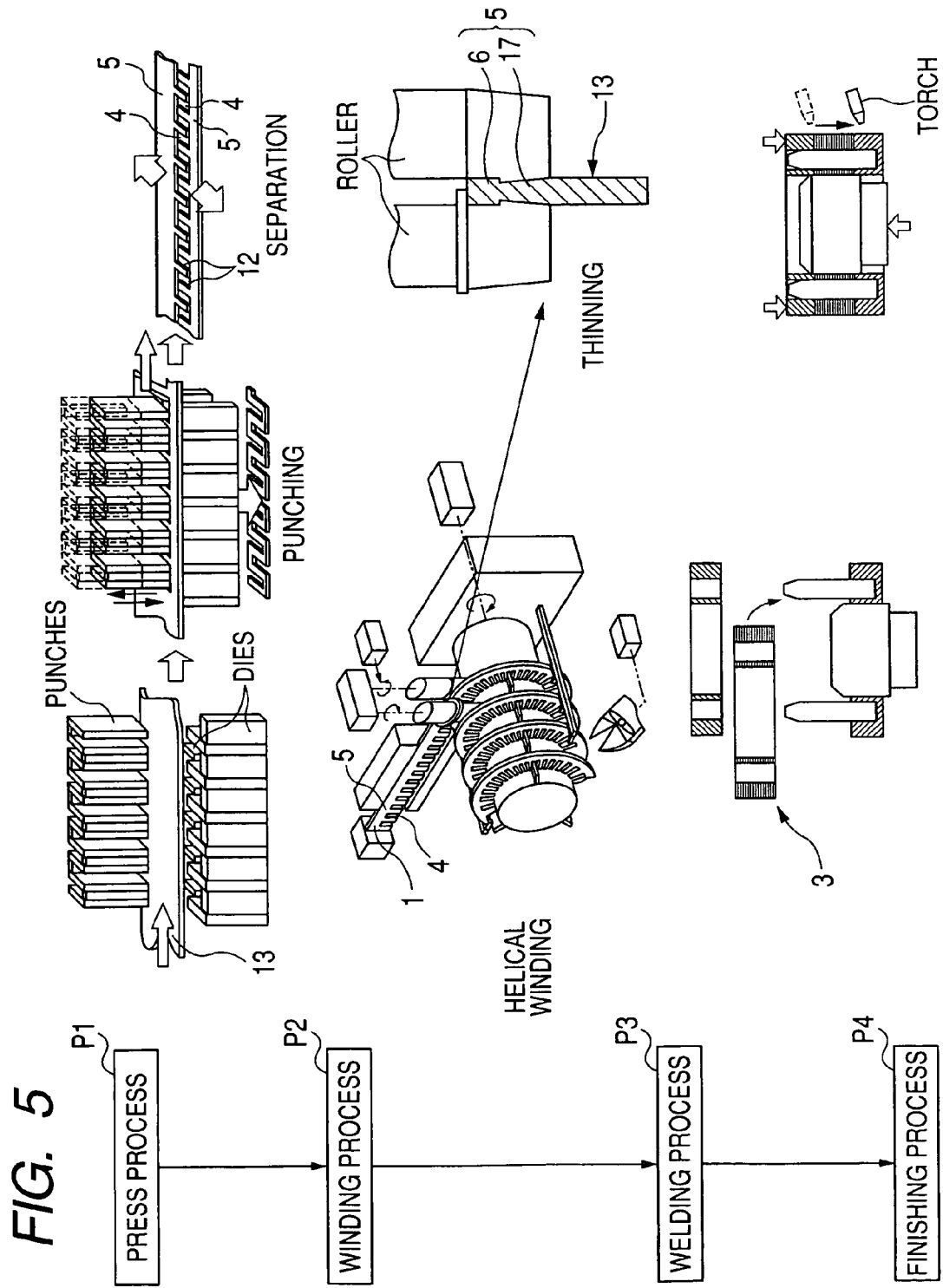
FIG. 5 is a view schematically showing a method of manufacturing the stator core shown in FIG. 4A according to embodiments of the present invention.

A method of manufacturing the stator core 3 will be described with reference to FIG. 5. FIG. 5 is a view schematically showing a method of manufacturing the core 3 shown in FIG. 4A according to this embodiment.

As shown in FIG. 5, the method of manufacturing the core 3 has a press process P1 for press-forming the teeth 12 in a long steel plate 13, a winding process P2 for helically winding the plate 13 into a laminated core 3 composed of the steel sheets 11 disposed in layers, a welding process P3 for partially welding the back portions 5 of the sheets 11 to one another, and a finishing process P4 for reshaping the laminated core 3 to form the stator core 3 from the laminated core 3. In this specification, the stator core 3 not yet reshaped is called the laminated core 3.

In the press process P1, the steel plate 13 substantially having a constant thickness is moved in the longitudinal direction of the plate 13 to be placed on dies of a press working machine and is punched to form the teeth 12 on one side of the plate 13. Therefore, the teeth 12 have the same constant thickness. This press working is performed in the machine while cutting the plate 13 every predetermined length or while successively forming the teeth 12 in the plate 13 without cutting the plate 13. Therefore, the teeth 12 and slots 4 are alternately formed along the longitudinal direction on one side of the steel plate 13, and the back portion 5 is placed on the other side of the steel plate 13.

Figure 6A:
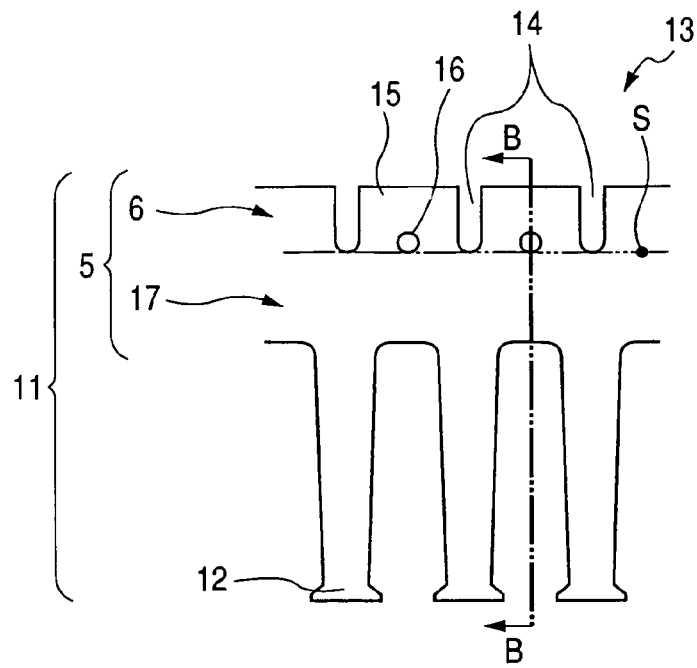
FIG. 6A is a plan view of a portion of a steel plate according to the first embodiment of the present invention.

The steel plate 13 obtained in the press process P1 will be described in detail with reference to FIG. 6A and FIG. 6B. FIG. 6A is a plan view of a portion of the steel plate 13 shaped in the press process P1, while FIG. 6B is a sectional view taken substantially along line B-B of FIG. 6A.

Figure 6B:
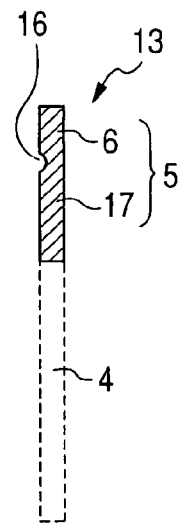
FIG. 6B is a sectional view taken substantially along line B-B of FIG. 6A.

As shown in FIG. 6A and FIG. 6B, the back portion 5 of the steel plate 13 is partitioned into an outer end portion 6 and a boundary portion 17 arranged along the width direction perpendicular to the longitudinal direction. The portion 6 is placed on the outermost side in the width direction. The boundary portion 17 is placed between the portion 6 and the group of teeth 12. When the teeth 12 are press-formed in the steel plate 13, a plurality of slits 14 are also formed in the portion 6 at equal intervals along the longitudinal direction. Each slit 14 has approximately a constant width in the longitudinal direction and extends along the width direction to be opened on one side of the width direction and to be closed on the other side facing the boundary portion 17. Therefore, a plurality of divided end portions 15 alternately placed with the slits 14 along the longitudinal direction are disposed in the portion 6. The slits 14 are preferably formed at the same intervals as those of the teeth 12. The slits 14 are preferably placed on the center axes of the respective teeth 12.

Further, a plurality of depressions 16 may be press-formed in the respective portions 15 to be placed on a line S passing through the closed ends of the slits 14. Each depression 16 is placed in the middle of the corresponding portion 15 in the longitudinal direction to be adjacent to the boundary portion 17. Each depression 16 is formed in a semi-spherical shape or in a shape of a frustum of right circular cone. The depth of each depression 16 is approximately equal to a half of the thickness of the plate 13, so that no depression 16 penetrates through the plate 13 along the axial direction. That is, each depression is placed on a bottom surface of the corresponding divided end portion 15 which faces toward the axial direction. Each depression faces a pair of shoulder surfaces of the corresponding divided end portion 15 which face each other along the circumferential direction and are inclined with respect to the axial and radial directions. When the plate 13 is helically wound or bent, the distance of the shoulder surfaces in the circumferential direction is lengthened so as to length the portion 6 along the circumferential direction.

Returning to FIG. 5, in the winding process P2, a laminated core 3 composed of the steel sheets 11 is formed by helically winding the plate 13 in the cylindrical shape so as to place the teeth 12 on the inner side of each sheet 11. The sheets 11 are aligned along the axial direction of the core 3. In this winding, before the plate 13 is wound, the back portion 5 of the plate 13 is lengthened in the longitudinal direction such that the length of the back portion 5 in the longitudinal direction is increased toward one side of the width direction opposite to the side of the teeth 12. Therefore, the plate 13 can be easily wound.

Figure 7A:
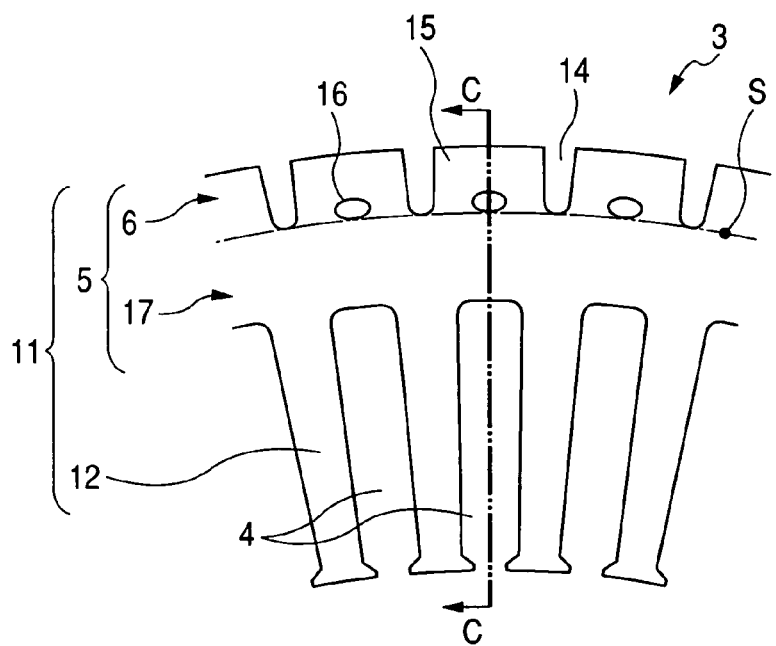
FIG. 7A is a plan view of a portion of a laminated core obtained by winding the plate shown in FIG. 6A.

The formation of the laminated core 3 in the winding process P2 will be described in detail with reference to FIG. 7A and FIG. 7B. FIG. 7A is a plan view of a portion of the laminated core 3 formed in the winding process P2, while FIG. 7B is a sectional view taken substantially along line C-C of FIG. 7A.

Figure 7B:
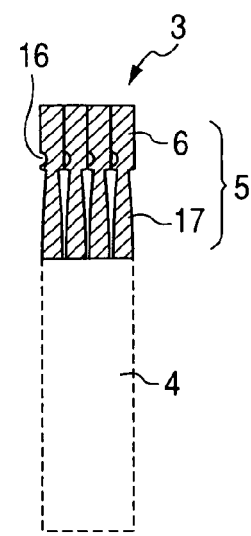
FIG. 7B is a sectional view taken substantially along line C-C of FIG. 7A.

As shown in FIG. 7A and FIG. 7B, the plate 13 is helically wound while the boundary portion 17 of the plate 13 is thinned by a roller or the like, and the laminated core 3 having the steel sheets 11 is formed. The boundary portion 17 of each sheet 11 is deformed in a tapered shape in section such that the thickness of the boundary portion 17 in the axial direction is decreased toward the outer side. Therefore, the length of the portion 17 in the circumferential direction is increased toward the outer side.

In contrast, the outer end portion 6 of the plate 13 is not thinned, so that the thickness of the outer end portion 6 in the axial direction is constant in each sheet 11. When the plate 13 is wound, each slit 14 is widened in the circumferential direction of the core 3 to lengthen the portion 6 of each sheet 11 in the circumferential direction. That is, each slit 14 is deformed approximately in a V-shape so as to increase the width of the slit 14 toward the outer side.

Further, when the boundary portion 17 is thinned, plastic flow directed in the circumferential direction is caused in the boundary portion 17. Because the depressions 16 are disposed between the portions 6 and 17 of the plate 13 (see FIG. 6A), the depressions 16 assist to increase the level of the plastic flow toward the outer side.

Moreover, when the plate 13 is wound, each slot 4 is deformed such that the width of the slot 4 in the circumferential direction is changed. A change in the width of the slot 4 is increased toward the inner side. Therefore, the plate 13 can be smoothly wound into the core 3.

As shown in FIG. 7B, the outer end portion 6 placed on the outermost side in each sheet 11 has the same thickness as that of the tooth 4 of the sheet 11. Therefore, the outer end portion 6 is not inclined toward the axial direction of the core 3 but extends straight toward the radial direction of the core 3 while the outer end portions 6 of the sheets 11 are in contact with each other. In this case, the outer end portion 6 placed on each axial end of the core 3 has an outer side surface extending to be substantially perpendicular to the axial direction of the core 3.

Further, each of magnetic paths of the magnetic field induced in the sheets 11 of the core 3 passes two teeth 12, for example, adjacent to each other and the back portion 5 between the two teeth 12. When centers of the slits 14 of each sheet 11 in the circumferential direction are placed at the same positions as centers of the respective teeth 12, the width of the back portion 5 of the sheet 11 along the magnetic path becomes larger than the width of the back portion 5 along the radial direction. That is, the width of the back portion 5 along the magnetic path is maximized. Therefore, the slits 14 do not largely reduce the cross section of the magnetic path of the magnetic field. Moreover, no depression 16 penetrates through the plate 13. Therefore, the depressions 16 do not largely reduce the cross section of the magnetic path. Accordingly, the slits 14 and the depressions 16 in the core 3 do not largely influence the magnetic field induced in the core 3.

Returning to FIG. 5, in the welding process P3, the laminated core 3 having a predetermined number of sheets 11 is disposed in a positional relationship adjusting device, and positions of the sheets 11 aligned with one another are minutely adjusted. That is, differences in positions of the inner ends of the sheets 11 and differences in positions of the slots 4 are set within a permissible range in each of the radial and circumferential directions of the core 3. Then, the outer end portions 6 of the sheets 11 are welded to one another by a welding torch so as to fix the positional relationship among the sheets 11. The welding point is limited to one position or more in the circumferential direction.

In the finishing process P4, the laminated core 3 is disposed in a core forming apparatus, and the apparatus forms a stator core from the laminated core 3 by precisely adjusting the circularity of the sheets 11 at the outer diameter, the concentricity between the inner and outer end portions of the sheets 11, and the perpendicularity of each sheet 11 to the axial direction of the core 3. When the circularity, concentricity and perpendicularity are obtained with high accuracy, the laminated core 3 is taken out from the forming apparatus as the stator core 3.

Figure 8:
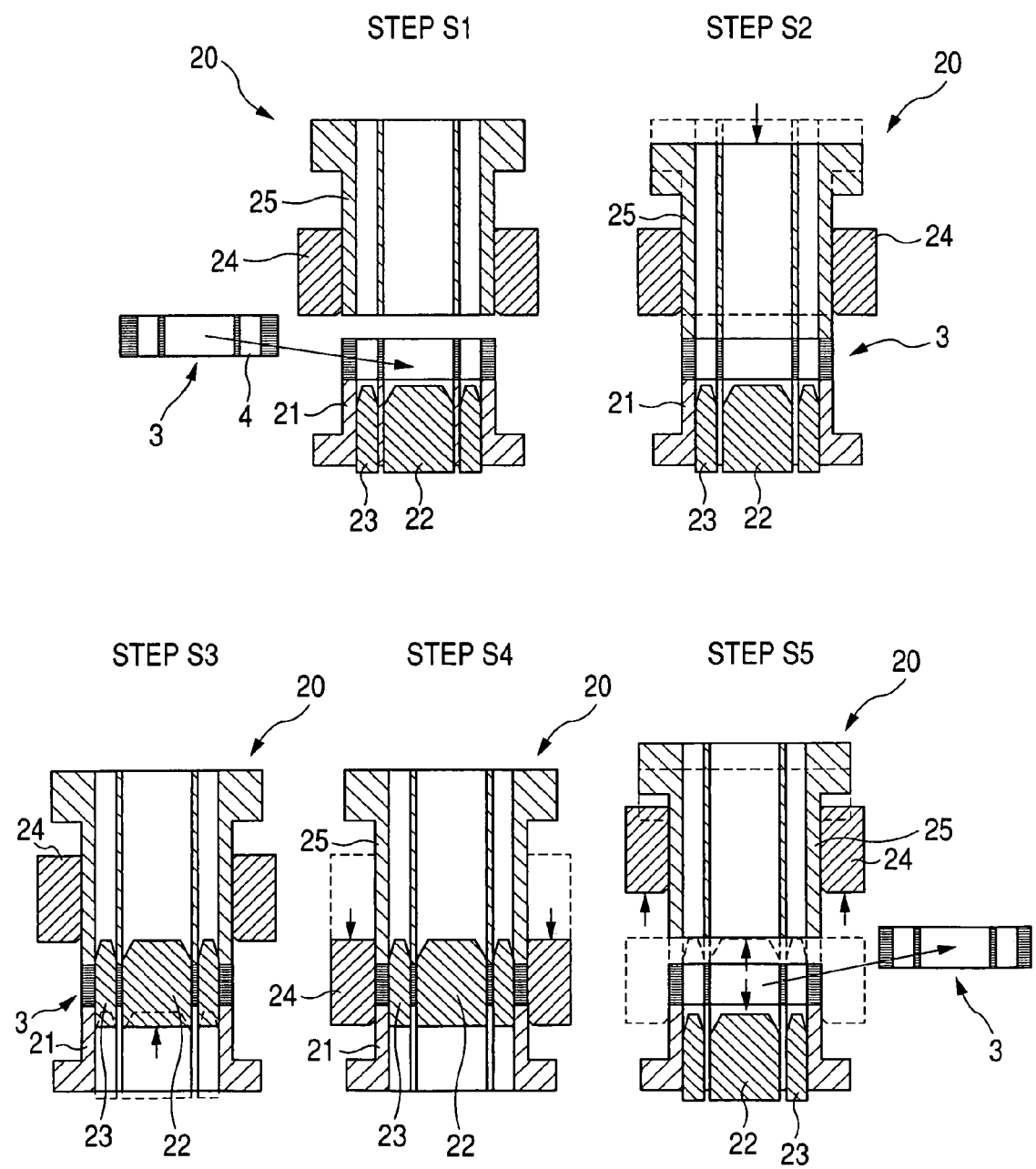
FIG. 8 is longitudinal sectional views of a forming apparatus for forming a laminated core at steps of a finishing process according to the first embodiment.

The finishing process P4 will be described in detail with reference to FIG. 8. FIG. 8 is longitudinal sectional views of a forming apparatus for forming a laminated core at steps of the finishing process P4.

As shown in FIG. 8, a forming apparatus 20 has a cylindrical work receiving member 21 for receiving the back portion 5 of the core 3 and inner end portions of the teeth 12 of the core 3, a columnar inner diameter core member 22 for restraining and reshaping the inner end portions of the teeth 12 disposed on the receiving member 21 to make uniform inner diameters of the sheets 11 along each of the axial and circumferential directions, a slot aligning member 23 for restraining and reshaping inner walls of the teeth 12 disposed on the receiving member 21 to precisely align the slots 4 of the sheets 11 along the axial direction and to precisely align the slots 4 at equal intervals along the circumferential direction, an outer diameter ironing ring member 24 for performing the ironing (or trimming or shaving) for the outer end portions 6 of the sheets 11 to make uniform outer diameters of the steel sheets 11 along each of the axial and circumferential directions, a work pressing member 25 for pressing the core 3 onto the member 21, and a driving unit such as a hydraulic press or the like (not shown) for driving the members 21 to 25.

The receiving member 21 is fixed in the apparatus 20. The member 21 has a ring-shaped upper end surface 21a on which the back portion 5 of the sheet 11 placed at one axial end of the core 3 is disposed. This surface 21a is flattened and extends to be substantially perpendicular to the axial direction of the core 3 disposed on the member 21. The work pressing member 25 has a ring-shaped lower end surface 25a on which the back portion 5 of the sheet 11 placed at the other axial end of the core 3 is placed. This surface 25a is flattened and extends to be substantially perpendicular to the axial direction of the core 3 disposed on the member 21. The surfaces 21a and 25a have the same outer diameter and are coaxially disposed with each other to face each other. The surfaces 21a and 25a may have respective outer diameters. The outer diameter of each surface is set to be slightly smaller than the outer diameter of the core 3. Therefore, the outer end portions 6 of the sheets 11 of the core 3 are protruded from the members 21 and 25 toward the outer side.

At step S1 of the process P4, the receiving member 21 receives the laminated core 3 welded in the welding process P3 such that the core 3 is coaxially disposed on the surface 21a of the member 21. Because the outer end portion 6 of each sheet 11 is not inclined with respect to the radial direction but extends straight in perpendicular to the axial direction, the outer end portion 6 placed on the member 21 reliably comes in face-contact with the surface 21a of the member 21.

At step S2 of the process P4, the member 25 is moved down by a driving member (not shown) and comes in contact with the outer end portion 6 of the core 3 to press the core 3 to the member 21 while being coaxially placed with the core 3. Therefore, the core 3 is fixed between the members 21 and 25. Because the outer end portion 6 of each sheet 11 extends straight in perpendicular to the axial direction, the outer end portion 6 placed on the member 25 reliably comes in face-contact with the surface 25a of the member 25.

At step S3 of the process P4, the member 23 is moved up by the driving member and is inserted into the slots 4 of the core 3 from the lower end of the core 3. Then, the member 22 is moved up by the driving member and is inserted into the center hole of the core 3 from the lower end of the core 3. The member 23 restricts and reshapes the teeth 12 of the core 3 to precisely adjust positions of the slots 4 in each of the radial and circumferential directions of the core 3. Therefore, the member 23 flattens each of the walls of the slots 4 of the core 3 along the axial direction of the core 3. Accordingly, the slots 4 of the core 3 can precisely have the same width in the circumferential direction and can be precisely disposed at equal intervals.

Then, the member 22 is moved up by the driving member and is inserted into the center hole of the core 3 from the lower end of the core 3. The member 22 restrains and reshapes the inner end portions of the teeth 12 to place the portions at the same position in the radial direction. Therefore, the member 22 makes uniform inner diameters of the sheets 14 of the core 3 and makes uniform the inner diameter of each steel sheet 14 along the circumferential direction of the core 3. Accordingly, the circularity of the core 3 at the inner diameter can be obtained with high precision.

At step S4 of the process P4, the ring member 24 is moved down by the driving member while being slid on the outer surface of the member 25. The ring member 24 performs the ironing for the outer end portions 6 of the sheets 11 of the core 3. The member 24 is made of a hard material such as cemented carbide. The inner diameter of the member 24 is slightly smaller than the outer diameter of the core 3. The half of the difference between the outer diameter of the core 3 and the inner diameter of the member 24 corresponds to a margin for ironing. The difference is set so as to appropriately set the margin for ironing.

In response to the ring member 24 moved down toward the receiving member 21, the ironing load or force directed in the axial direction of the core 3 is given or applied to the outer end portions 6 of the sheets 11 of the core 3. Because each outer end portion 6 extends straight toward the radial direction perpendicular to the axial direction, the member 24 easily causes plastic deformation in the outer end portions 6 protruded by the appropriate margin for ironing so as to push the outer end portions 6 toward the inner side in the radial direction, and ends of the outer end portions 6 are deformed to uniformly set the lengths of the sheets 11 of the core 3 in the radial direction.

Because the outer end portion 6 of each sheet 11 has the same thickness as that of the teeth 12 of the sheet 11, no opening is formed between the outer end portions 6. Accordingly, the plastic deformation directed toward the radial direction can be efficiently caused in the outer end portions 6 in response to the ironing load without buckling or bending any outer end portion 6 toward the axial direction to uniformly set the radial lengths of the sheets 11.

Further, because no opening is formed between the outer end portions 6, each outer end portion 6 can receive a sufficient ironing load without enlarging any opening. Therefore, each outer end portion 6 can have a sufficient margin for ironing to reliably receive a sufficient ironing load. Accordingly, the ironing can be preferably performed for the core 3 to uniformly adjust the outer diameters of the sheets 11 of the core 3. As a result, the laminated core 3 can precisely obtain the circularity at the outer diameter, the concentricity between the inner and outer portions of the core 3, and the perpendicularity of each sheet 14 to the axial direction of the core 3. That is, the stator core 3 is obtained.

At step S5 of the process P4, the members 24 and 25 are moved up, and the members 22 and 23 are moved down to release the stator core 3 from the apparatus 20. Then, the core 3 is taken out from the apparatus 20, so that the finishing process P4 is completed. That is, the stator core 3 can be obtained by performing the ironing for the laminated core 3 in the process P4. Thereafter, the stator core 3 is fixed to the frame 9 (see FIG. 9).

Figure 9:
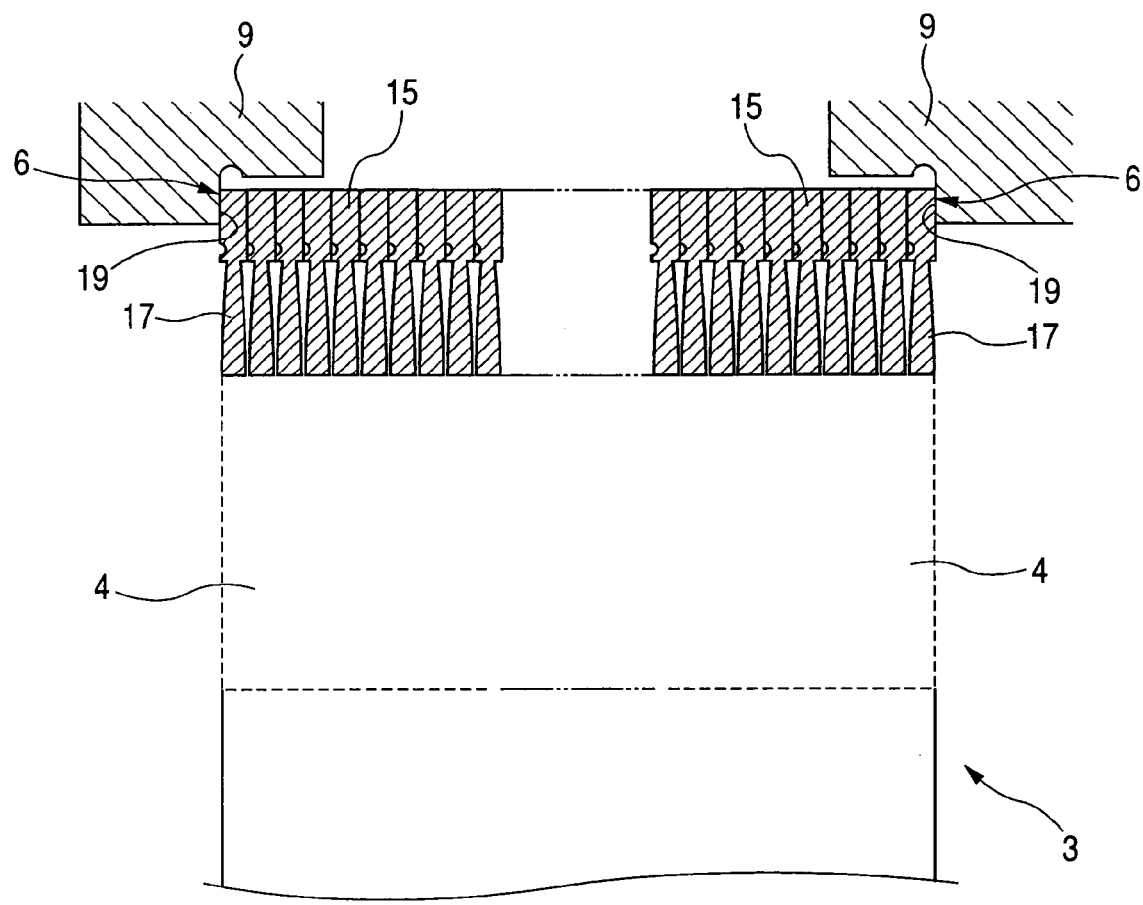
FIG. 9 is a longitudinal sectional view of a stator core fastened to a frame according to the first embodiment.

FIG. 9 is a longitudinal sectional view of the core 3 fastened to the frame 9. As shown in FIG. 9, the core 3 is inserted into an opening 9a of the frame 9 such that the outer side surfaces of two outer end portions 6 placed on respective axial ends of the core 3 are attached to respective side walls 19 of the frame 9. The side walls 19 extend in parallel to each other and face each other through the opening 9a. The two outer end portions 6 are attached to the side walls 19 such that the axial direction of the core 3 is perpendicular to the side walls 19. Then, the core 3 is fastened to the frame 9 by the through bolts 8 (see FIG. 3).

Because no outer end portion 6 of the sheets 3 is thinned, the outer end portions 6 of the core 3 have the same thickness as that of the teeth 12 of the core 3. In this case, no outer end portion 6 of the core 3 is inclined toward the axial direction, but each outer end portion 6 extends straight perpendicularly to the axial direction while the outer end portions 6 of the core 3 are directly brought into contact with one another without any openings between outer end portions 6. Therefore, when the outer end portion 6 is attached to each side wall 19 of the frame 9, the portion 6 comes in face-contact with the side wall 19. Accordingly, the core 3 can be tightly fastened to the frame 9, and the core 3 can be reliably fixed to the frame 9 for a long time against vibrations of the alternator 1.

As described above, in this embodiment according to the present invention, as shown in FIG. 5, FIG. 6A, FIG. 6B, FIG. 7A, FIG. 7B and FIG. 8, the stator core 3 of the alternator 1 representing one electric rotating machine is manufactured in the steps of (1) forming the steel plate 13 with the teeth 12 and the back portion 5 substantially set at a constant thickness such that the teeth 12 are placed along the longitudinal direction of the steel plate 13 on one side of the plate 13 and such that the back portion 5 is placed on the other side of the plate 13, (2) winding the steel plate 13 to form a lamination of the ring-shaped steel sheets 11 in the cylindrical shape such that the teeth 12 of the plate 13 are placed on the inner side of the steel sheets 11 and such that the back portion 5 of the plate 13 is placed on the outer side of the steel sheets 11, and (3) performing ironing for the back portions 5 of the sheets 11 to manufacture the stator core 3. The step of forming the plate 13 includes forming the slits 14 placed along the longitudinal direction in the back portion 5 to form the divided end portions 15 alternately placed with the slits 14 and to form the boundary portion 17 disposed between the group of teeth 12 and the group of divided end portions 15. The step of winding the steel plate 13 includes thinning the boundary portion 17 of the steel plate 13 such that the thickness of the boundary portion 17 in each steel sheet 11 is decreased toward the outer side.

Therefore, the stator core 3 comprises the steel sheets 11 obtained by winding the steel plate 13 in the cylindrical shape. Each steel sheet 11 comprises the teeth 12 disposed along the circumferential direction of the core 3 on the inner side of the sheet 11, the divided end portions 15 disposed on the outer side of the sheet 11 along the circumferential direction, the slits 14 alternately disposed with the divided end portions 15 on the outer side along the circumferential direction, and the boundary portion 17 disposed between the group of teeth 12 and the group of divided end portions 15. The thickness of the divided end portions 15 is substantially equal to the thickness of the teeth and is substantially constant in the radial direction. The boundary portion 17 has a changing thickness decreased toward the outer side.

With this method of manufacturing the stator core 3 and the configuration of the stator core 3, because no divided end portion 15 of the core 3 is thinned, the outer end portion 6 composed of the divided end portions 15 of each sheet 11 has the same thickness as that of the tooth 12. In this case, no outer end portion 6 of the core 3 is inclined toward the axial direction, but each outer end portion 6 extends straight in perpendicular to the axial direction while the outer end portions 6 of the sheets 11 are directly brought into contact with one another without any openings between outer end portions 6.

Therefore, when two outer end portions 6 of two sheets 11 placed at the axial ends of the core 3 are attached to respective side walls 19 of the frame 9 of the alternator 1 to fasten the core 3 to the frame 9, the outer end portions 6 reliably come in face-contact with the respective side wall 19 of the frame 9.

Accordingly, the stator core 3 can be reliably fixed in the alternator 1 while maintaining a sufficient fixing force against vibrations of the alternator 1, and the core 3 can reliably output a rated electric power in response to a rotational force for a long time.

Further, the slits 14 of each steel sheet 11 are arranged substantially at the same intervals as those of the teeth of the steel sheet 11. Accordingly, the outer end portion 6 of the sheet 11 can be efficiently lengthened in the circumferential direction in response to the deformation of the slits 14 and slots 4 while magnetic resistance of the core 3 is maintained to a small value.

Moreover, a plane of the group of divided end portions 15 of each steel sheet 11 is the same as or parallel to a plane of the group of teeth 12 of the sheet 11. Accordingly, the divided end portions 15 of the steel sheet 11 placed on each axial end of the core 3 can reliably come in face-contact with the frame 9, and the core 3 can be tightly fastened to the frame 9 so as to be reliably fixed in the alternator 1 for a long time against vibrations of the alternator 1.

Furthermore, the slits 14 of each steel sheet 11 are arranged substantially at the same intervals of those of the teeth 12 of the sheet 11, and centers of the slits 14 in the circumferential direction are placed at the same positions as centers of the respective teeth 12. With this structure, even when the width of the boundary portion 17 in the radial direction is narrowed, the slits 14 do not approach any slots 4 but approach the respective teeth 12. Therefore, the core 3 can reliably have a sufficient mechanical strength regardless of the width of the boundary portion 17. In this case, the width of the boundary portions 17 of each sheet 11 can be narrowed so as to almost maintain the area of the core back portion 5 of the sheet 11 regardless of the positions of the slits 14 in the circumferential direction, and the divided end portions 15 of the sheet 11 can have the sufficient area required to be in contact with the frame 9. Alternatively, because the width of the boundary portions 17 of the sheets 11 can be narrowed, the outer diameter of the core 3 can be shortened.

Accordingly, the core 3 can be fixed to the frame 9 more stably, or a small-sized alternator 1 can be manufactured. Further, because the back portion 5 of each sheet 11 can have a predetermined width in the radial direction regardless of the length of the slits 14, the increase of magnetic resistance of the core 3 can be suppressed.

Still further, the depressions 16 are disposed in the respective divided end portions 15 so as to be adjacent to the boundary portion 17. Therefore, when the boundary portion 17 is thinned while plastic flow is caused in the boundary portion 17 along the circumferential direction, the depressions 16 can assist to increase the level of the plastic flow toward the outer side.

Embodiment 2

In the first embodiment, each steel sheet 11 extends straight in the radial direction. However, the boundary portion 17 of each steel sheet 11 may be inclined toward the axial direction on condition that the group of divided end portions 15 of each steel sheet 11 extends in a plane perpendicular to the radial direction to be parallel to the group of teeth 12 of the sheet 11.

Figure 12:
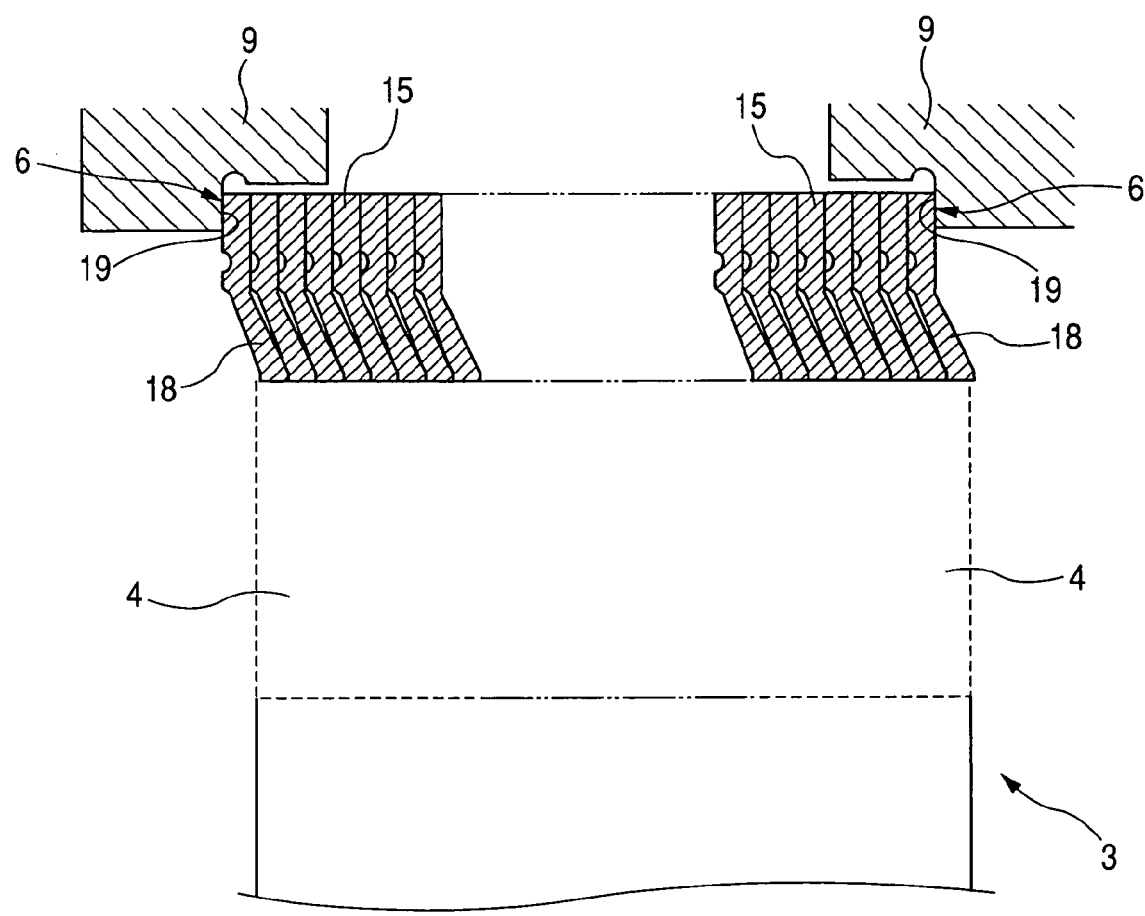
FIG. 12 is a longitudinal sectional view of a stator core fastened to a frame according to the second embodiment.

FIG. 10A is a plan view of a portion of the steel plate 13 according to the second embodiment, while FIG. 10B is a sectional view taken substantially along line D-D of FIG. 10A. FIG. 11A is a plan view of a portion of the laminated core 3 obtained by winding the plate 13 shown in FIG. 10A, while FIG. 11B is a sectional view taken substantially along line E-E of FIG. 11A. FIG. 12 is a longitudinal sectional view of the stator core 3 fastened to the frame 9.

As shown in FIG. 10A and FIG. 10B, after the slits 14 and the depressions 16 are formed in the plate 13, the boundary portion 18 is inclined in the thickness or axial direction of the plate 13 to deform the portion 18 to an inclined boundary portion 18. In this case, the group of divided end portions 15 is maintained to extend in a plane parallel to an extending plane of the group of teeth 12. Therefore, the width of the plate 13 is narrowed.

Thereafter, as shown in FIG. 11A and FIG. 11B, the plate 13 having the narrowed width is wound into a laminated core 3 formed in the cylindrical shape while the inclined portion 18 of the plate 13 is slightly thinned so as to gradually decrease the thickness of the inclined portion 18 toward the outer side in each sheet 11. The group of portions 15 of each sheet 11 extends in a plane parallel to an extending plane of the group of teeth 12 of the sheet 11.

Because the thickness of each outer end portion 6 is the same as that of the tooth 12, each outer end portion 6 extends to be perpendicular to the axial direction, and the outer end portions 6 of the sheets 11 are aligned along the axial direction to be in contact with one another without forming any opening between the outer end portions 6.

Further, because the width of the plate 13 is narrowed, the outer diameter of the laminated core 3 is smaller than that in the first embodiment. Therefore, the plastic flow of the inclined portion 18 caused along the circumferential direction in the winding process P2 becomes small, and the thinned thickness of the inclined portion 18 according to the second embodiment can be set to be larger than the thinned thickness of the boundary portion 17 according to the first embodiment. That is, the radial width of the opening formed between the adjacent inclined portions 18 is smaller than that according to the first embodiment.

Thereafter, the portions 6 of the laminated core 3 are welded together, ends of the portions 6 are corrected by the apparatus 20 (see FIG. 8) in the ironing work to correctly set the outer diameter of the core 3, and the core 3 is taken out from the apparatus 20 as a stator core 3.

Thereafter, as shown in FIG. 12, the stator core 3 is inserted into the opening 9a of the frame 9 such that the outer side surfaces of two outer end portions 6 placed on the axial ends of the core 3 are attached to respective side walls 19 of the frame 9 such that the axial direction of the core 3 is perpendicular to the side walls 19. Then, the core 3 is fastened to the frame 9 by the through bolts 8 (see FIG. 3). Because the outer end portion 6 of each sheet 11 is perpendicular to the axial direction, the core 3 reliably comes in face-contact with the frame 9. Therefore, an outer-inclination type stator core 3 is tightly fastened to the frame 9 while being in face-contact with the frame 9.

Accordingly, in the same manner as in the first embodiment, the stator core 3 can be reliably fixed in the alternator 1 while maintaining a sufficient fixing force against vibrations of the alternator 1, and the core 3 can reliably output a rated electric power in response to a rotational force for a long time.

Further, because the portion 18 of the plate 13 is inclined toward the thickness direction so as to narrow the width of the plate 13, the plate 13 can be easily wound into the laminated core 3.

Moreover, the portion 18 of each sheet 11 is inclined toward the axial direction so as to shorten the width of the inclined portion 18 in the radial direction. Accordingly, the outer diameter of the stator core 3 can be shortened, so that the core 3 can be easily disposed in the alternator 1.

These embodiments should not be construed as limiting the present invention to structures of those embodiments, and the structure of this invention may be combined with that based on the prior art. For example, in these embodiments, the stator core 3 based on the manufacturing method is applied for the alternator 1 representing one electric rotating machine. However, the stator core 3 based on the manufacturing method may be applied for an electric rotating machine such as a motor driven in response to a current of a high voltage.

What is claimed is:

1. A stator core of an electric rotating machine, comprising:
   a plurality of ring-shaped steel sheets obtained from a single steel plate wound in a cylindrical shape,
   each steel sheet comprising:
   a plurality of teeth disposed along a circumferential direction of the core on an inner side of the steel sheet in a radial direction of the core;
   a plurality of divided end portions disposed along the circumferential direction on an outer side of the steel sheet in the radial direction, a thickness of the divided end portions in an axial direction of the core being substantially equal to a thickness of the teeth and being substantially constant in the radial direction;
   a plurality of slits alternately disposed with the divided end portions along the circumferential direction on the outer side; and
   a single boundary portion disposed between the group of teeth and the group of divided end portions, the boundary portion having a changing thickness in the axial direction so as to be decreased toward the outer side in the radial direction.

2. The stator core according to claim 1, wherein the slits of each steel sheet are arranged substantially at the same intervals as those of the teeth of the steel sheet.

3. The stator core according to claim 1, wherein the divided end portions of each steel sheet are placed in a first plane parallel to a second plane in which the teeth of the steel sheet are placed.

4. The stator core according to claim 1, wherein the slits of each steel sheet are arranged substantially at the same intervals of those of the teeth of the steel sheet, and centers of the slits in the circumferential direction are placed at the same positions as centers of the respective teeth.

5. The stator core according to claim 1, wherein the boundary portion of each steel sheet is inclined toward the axial direction.

6. The stator core according to claim 1, wherein each slit extending in the radial direction has a width along the circumferential direction such that the width is increased toward the outer side.

7. The stator core according to claim 1, wherein each steel sheet further comprises a plurality of depressions disposed on the respective divided end portions so as to be adjacent to the boundary portion, each depression facing a pair of shoulder surfaces of the corresponding divided end portion which face each other along the circumferential direction and are inclined with respect to the axial and radial directions, each depression being placed on a bottom surface of the corresponding divided end portion which faces toward the axial direction.

8. A method of manufacturing a stator core of an electric rotating machine, comprising the steps of:
   forming a single steel plate with a plurality of teeth and a back portion substantially set at a constant thickness such that the teeth are placed along a longitudinal direction of the steel plate on a first side of the steel plate and such that the back portion is placed on a second side of the steel plate opposite to the first side;
   winding the steel plate to form a plurality of ring-shaped steel sheets in a cylindrical shape such that the teeth are placed along a circumferential direction of the core on an inner side of the steel sheets in a radial direction of the core and such that the back portion is placed along the circumferential direction on an outer side of the steel sheets; and
   performing ironing for the back portions of the steel sheets to manufacture the stator core,
   wherein the step of forming the steel plate includes:
   forming a plurality of slits placed along the longitudinal direction in the back portion to form a plurality of divided end portions alternately placed with the slits, a thickness of the divided end portions in an axial direction of the core being substantially equal to a thickness of the teeth and being substantially constant in the radial direction, and to form a single boundary portion disposed between the group of teeth and the group of divided end portions, and
   the step of winding the steel plate includes:
   thinning the single boundary portion of the steel plate such that a thickness of the single boundary portion in each steel sheet has a changing thickness in the axial direction so as to be decreased toward the outer side in the radial direction.

9. The method according to claim 8, wherein the step of winding the steel plate includes:
   helically winding the steel plate.

10. The method according to claim 8, wherein the step of forming the steel plate includes:
    inclining the single boundary portion toward a thickness direction such that the single boundary portion of each steel sheet is inclined toward the axial direction of the stator core.

11. The method according to claim 8, wherein the step of winding the steel plate includes:
    placing the divided end portions of each steel sheet in a first plane parallel to a second plane in which the teeth of the steel sheet are placed.

12. The method according to claim 8, wherein the step of winding the steel plate includes:
    widening a width of each of the slits of the steel sheets in the circumferential direction of the core such that the width of the slit is increased toward the outer side.

13. The method according to claim 8, wherein the step of forming the steel plate includes:
    forming a plurality of depressions in the respective divided end portions so as to be adjacent to the single boundary portion, each depression facing a pair of shoulder surfaces of the corresponding divided end portion which face each other along the circumferential direction of the core and are inclined with respect to the axial and radial directions, each depression being placed on a bottom surface of the corresponding divided end portion which faces toward the axial direction of the core.

14. The stator core according to claim 1, wherein the single boundary portion of each steel sheet successively extends in a ring shape along the circumferential direction so as to be connected with each of all the teeth of the steel sheet disposed along the circumferential direction and each of all the divided end portions of the steel sheet disposed along the circumferential direction.

15. The stator core according to claim 1, wherein a length of the single boundary portion in the circumferential direction is set to be increased toward the outer side.

* * * * *